US005982456A

United States Patent [19]
Smith, Jr. et al.

[11] Patent Number: 5,982,456
[45] Date of Patent: Nov. 9, 1999

[54] DIGITAL VIDEO SWITCHER INCLUDING A GENERAL PURPOSE PROCESSOR AND A CONTROL PROCESSOR

[75] Inventors: Roger W. Smith, Jr., Uxbridge; Greg Carlson, Chelmsford, both of Mass.

[73] Assignee: ECHOlab, Inc., Chelmsford, Mass.

[21] Appl. No.: 08/823,968

[22] Filed: Mar. 25, 1997

[51] Int. Cl.[6] .......................... H04N 5/268; H04N 5/222
[52] U.S. Cl. ............................................ 348/722; 348/705
[58] Field of Search .................................. 348/705, 706, 348/782, 571, 578, 584

[56] References Cited

U.S. PATENT DOCUMENTS

| | | | |
|---|---|---|---|
| 4,835,613 | 5/1989 | Johnson | 358/181 |
| 4,853,784 | 8/1989 | Abt et al. | 358/181 |
| 4,858,011 | 8/1989 | Jackson et al. | 358/181 |
| 4,890,163 | 12/1989 | Johnson et al. | 358/181 |
| 5,166,797 | 11/1992 | Angell | 358/183 |
| 5,189,516 | 2/1993 | Angell et al. | 358/181 |
| 5,200,825 | 4/1993 | Perine | 348/722 |
| 5,262,865 | 11/1993 | Herz | 348/722 |
| 5,264,929 | 11/1993 | Yamaguchi | 358/108 |
| 5,283,639 | 2/1994 | Esch et al. | 348/722 |
| 5,285,283 | 2/1994 | Fairhurst et al. | 348/705 |
| 5,287,186 | 2/1994 | Takamori | 348/705 |
| 5,307,456 | 4/1994 | MacKay | 395/154 |
| 5,424,785 | 6/1995 | Orphan | 348/722 |
| 5,638,133 | 6/1997 | Squier et al. | 348/578 |
| 5,801,785 | 9/1998 | Crump et al. | 348/705 |

OTHER PUBLICATIONS

Product literature; ECHOlab, Inc. (Burlington, MA) "PC–3" p. 1.
Product literature; ECHOlab, Inc. (Burlington, MA) "PC–A" p. 1.
Product literature; Pinnacle (Sunnyvale, CA) "Prizm Video WorkStation", pp. 1–5.
Product literature; Matrox Digisuite, "Build on a Solid Foundation" pp. 1–11.
Product literature; Matrox DigiMix, (Dorval, Quebec) "Video/Graphics Mixer with 2D DVE", pp. 1–5.
Product literature; Grass Valley Group, (Grass Valley, CA) "Model 1000—Digital Production Switcher" pp. 1–6.
Product literature; Grass Valley (Grass Valley, CA) Model 1200 Digital Production Switcher—Component Digital Switching, Superb Keying Control and Flexibility, Big Performance in a Compact Design, pp. 1–4.
Product literature; Video GainesVille (Cypress, CA) CV—132—Digital Production Switcher, p. 14.

*Primary Examiner*—Victor R. Kostak
*Attorney, Agent, or Firm*—Testa, Hurwitz & Thibeault, LLP

[57] ABSTRACT

A digital video production switcher processes a plurality of video signals in a production environment. The switcher includes a control panel for receiving operator inputs and switching unit for receiving video input signals and for providing video output signals. The switcher also includes a pair of tightly coupled, independent processors synchronized to the video frame rate: a control processor and a general purpose processor. The control processor controls the "live critical" production functions. The control processor provides control signals, in response to operator inputs, that program the switching unit to provide desired video output signals in real time. The general purpose processor runs an open architecture operating system and provides control signals, in response to operator inputs, that cause the switching unit to provide desired video output signals in real time.

19 Claims, 1 Drawing Sheet

DIGITAL VIDEO SWITCHER INCLUDING A GENERAL PURPOSE PROCESSOR AND A CONTROL PROCESSOR

FIELD OF THE INVENTION

The invention relates generally to digital video switchers. More particularly, the invention relates to digital video switchers including two processors (i.e., a general purpose processor and a control processor) which are independent, tightly coupled and synchronized to the video frame rate for real time switching functionality in broadcast environments.

BACKGROUND

In television programming, video switchers receive video input signals from various video sources and direct (or "switch") to the switcher outputs for transmission (or recording) picture images from selected sources. The video sources can include network feeds, satellite feeds, cameras, receivers and recorders. Switching can be done manually by an operator or automatically by programming the switcher to perform a plurality of operations (or "transitions") in an predetermined sequence. Transitions can include cuts, fades, mixes and combinations thereof.

A conventional video switcher typically includes a switching unit, mix/effects (M/E) amplifiers, a control processor and a control panel. An operator manipulates various knobs, levers, and switches on the control panel. The control processor controls the switching unit and M/E amplifiers to provide the video output signal. The switching unit receives video input signals and provides the input signals to the M/E amplifiers. The M/E amplifiers, responsive to control signals from the control processor, combine selected input signals to produce a video output signal. For convention switchers capable of supporting live broadcasts, the control processor is synchronized to the video frame rate and provides real time switching functionality within 1/60th of a second.

Over the years, video switchers have utilized various types of technology. Known analog video switchers have used analog circuitry and a single processor running a proprietary closed architecture operating system. Known digital switchers have used one or more processors running a proprietary closed architecture operating system. For example, the Grass Valley Group manufactures a digital production switcher (Model 2200™) having multiple processors running a proprietary closed architecture operating system. These closed architecture switchers are essentially fixed in their capabilities when manufactured and are generally not upgradeable by third parties.

In recent years, video switcher companies have attempted to take advantage of the increased capability of standard platform computing systems (i.e., PC-based open architecture systems). By way of example, Pinnacle manufactures a digital switcher (Alladin™) that operates in conjunction with a personal computer (PC). The switcher couples to the PC through a SCSI port. The switcher includes a control processor running a proprietary closed architecture operating system, and the PC includes a general purpose processor running an open architecture operating system. The control processor provides real time switching for live broadcasting. The PC processor provides non-real time switching (e.g., off-line image processing and image storage), but is incapable of providing real time switching functionality. In another example, Matrox manufactures a digital switcher (DigiMix™) that includes standard platform computing capability. More specifically, the switcher includes a control processor and a general purpose processor. However, the two processors are not independent of each other, and the general purpose processor is not synchronized to the video frame rate. Thus, the switcher is incapable of providing real time switching functionality.

The assignee of the subject application, ECHOlab, Inc., manufactures two switching products that include standard platform computing capability. ECHOlab's PC-A is a two-channel audio switcher on a standard IBM circuit card that can be plugged into a PC. ECHOlab's PC-3 is a video switcher on a standard IBM circuit card capable of being plugged into a PC. Both products can be controlled by an on-board control processor or a general purpose processor running the Windows™ NT operating system on the PC. After installation of either product in the PC, the two processors are independent of each other and tightly coupled.

The PC-3 is incapable of providing real time switching functionality in live broadcast environment for at least two reasons. First, the general purpose processor is not synchronized to the video frame rate. Second, Windows™ application software running on the general purpose processor provides the control panel as a window on the PC display. Thus, the control panel would not survive a PC failure in a broadcast environment.

OBJECT OF THE INVENTION

It is therefore a principle object of the invention to provide a digital video switcher that includes two processors (i.e., a general purpose processor running an open architecture operating system and a control processor running a second architecture operating system and supporting real time critical functions) which are independent, tightly coupled and synchronized to the video frame rate for real time switching functionality in broadcast environments.

SUMMARY OF THE INVENTION

The present invention features a digital video production switcher for processing a plurality of video signals in a production environment. The switcher includes a switching unit for receiving video input signals from various devices (e.g., network feeds, satellite feeds, cameras, receivers and recorders) and for providing video output signals and a control panel for receiving operator inputs. The switcher also includes a pair of independent processors synchronized to the video frame rate—a control processor and a general purpose processor. The two processors are tightly coupled (i.e., they share a section of memory) to allow for high bandwidth communications.

The control processor controls the "live critical" production functions (i.e., input/output video switching, mixing, wiping and keying). The control processor is electrically connected to the switching unit and the control panel and supports control panel operations independent of the general purpose processor. The control processor provides control signals, in response to operator inputs received from the control panel, that program the switching unit to provide desired video output signals in real time. In one embodiment, the control processor runs a closed architecture operating system.

The general purpose processor is electrically connected to the switching unit and the control processor. The general purpose processor runs an open architecture operating system and generates control signals in response to operator inputs received from the control processor. These control signals cause other processing units to process selected input signals and generate desired video output signals. The general purpose processor programs the switching unit to provide the desired video output signals in real time. In one embodiment, the general purpose processor is running a self-contained, multitasking operating system (Windows NT™).

The switcher can also include various units that support live and post productions environments. A mix/effects amplifier can be electrically coupled to the switching unit and the two processors. The mix/effects amplifier, in response to control signals from the processors, combines selected video input signals to produce desired video output signals. A storage unit can be coupled to the processors for storing video signals. A network interface unit can be coupled to the general purpose processor for receiving video input signals and for providing video output signals over a local area network or a wide area network. A digital video effects unit can be coupled to the two processors for processing of video input signals for generating special effects video output signals (e.g., page curls, flying video cubes, water ripples, spheres, highlights and shadows, and slats and waves). A multi-function video effects unit electrically coupled control and general purpose processors for providing JPEG clip store, still store and slow motion processing capabilities. A post-production digital video effects unit can be coupled to the two processors for non-real time processing of video input signals for generating special effects video output signals.

BRIEF DESCRIPTION OF THE DRAWINGS

These and other features of the invention are more fully described below in the detailed description and accompanying drawing.

DETAILED DESCRIPTION

Figure 1:
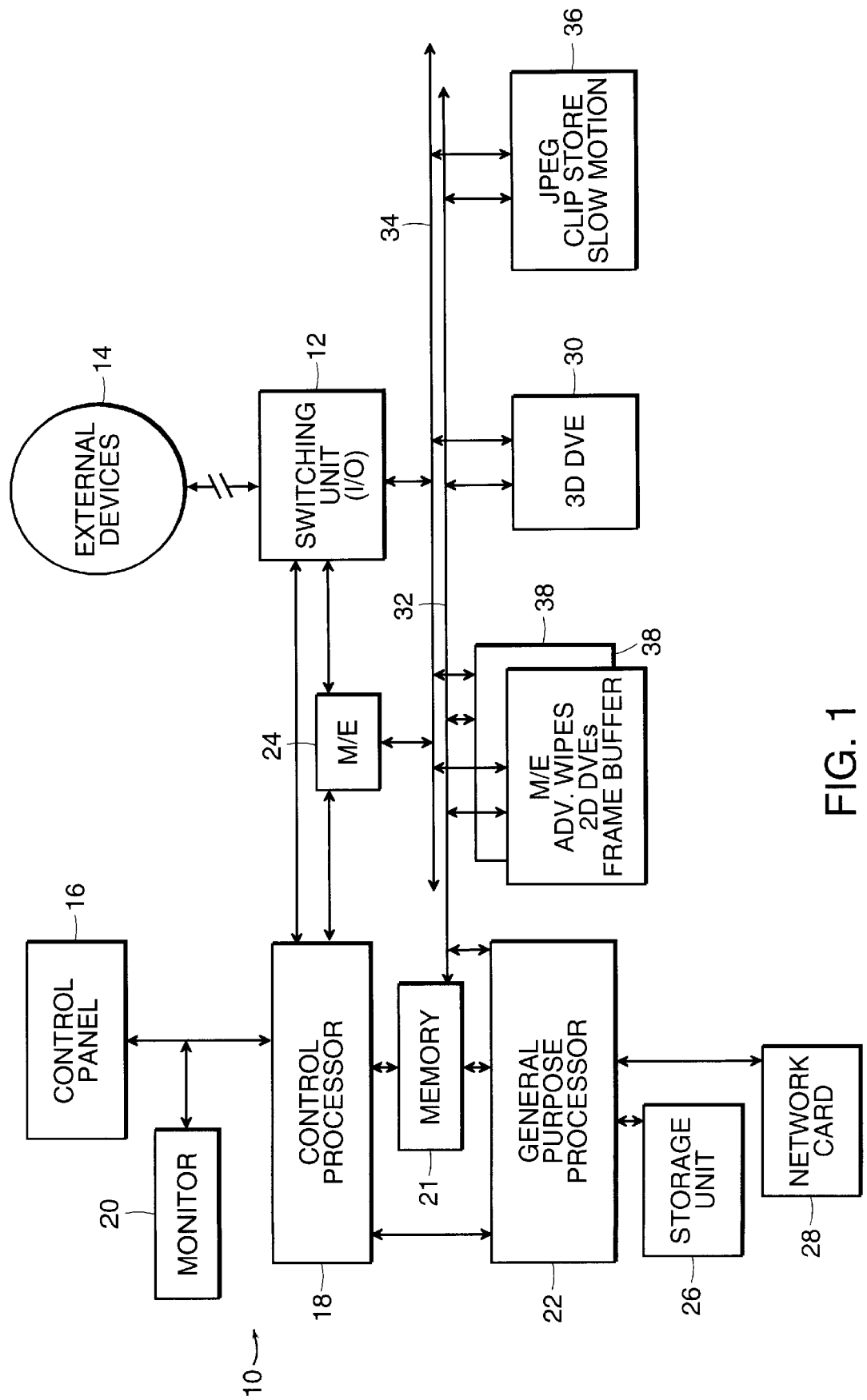
FIG. 1 is a block diagram illustrating a digital video production switcher for processing a plurality of video signals in a production environment in accordance with the invention.

FIG. 1 is a block diagram of a digital video production switcher for processing a plurality of video signals. The assignee, ECHOlab, Inc., manufactures digital video production switchers (e.g., ECHOlab 5000 Series) incorporating the principles of the invention.

As shown, the switcher 10 includes a switching unit 12 for receiving video input signals from various external devices 14 (e.g., network feeds, satellite feeds, cameras, receivers and recorders) and for providing video output signals for television broadcasts. In one embodiment, the switching unit 12 has twenty-seven input channels and twelve output channels. A control panel 16 receives operator inputs and provides such inputs to a control processor 18. The assignee, ECHOlab, Inc., manufactures control panels (e.g., ECHOlab Models 5700, 5800 or 5900) that can be used in the switcher 10. A monitor 20, which is electrically connected to the control panel 16 and the control processor 18, displays selected video output signals to the operator.

The switcher 10 includes a pair of independent processors (i.e., the control processor 18 and a general purpose processor 22) synchronized to the video frame rate. The two processors are "tightly coupled" in that they share a section of a dual port memory 21 to allow for high bandwidth interprocessor communications. The control processor 18 is electrically connected to the switching unit 12 and the control panel 16. The general purpose processor 22 is electrically connected to the switching unit 12 and the control processor 18. Both processors are synchronized to the video frame rate (i.e., 1/60th of a second) and, therefore, can provide desired video output signals in real time. The video processing operations are partitioned between the two processors to provide "fail-safe" switching operations in a live broadcast environment.

More specifically, the control processor 18 controls the "live critical" production functions and supports control panel 16 operations independent of the general purpose processor 22. During a broadcast, the "live critical" functions include input/output video switching and mix-effect control functions (i.e., mixing, wiping and keying).

In one embodiment, the control processor 18 runs a closed architecture operating system. The control processor 18 provides control signals, in response to operator inputs via the control panel 16, that cause other processing units (22, 24, 26, 28, 30) to process selected input signals and generate a desired video output signal. The control processor 18 programs the switching unit 12 to provide desired video output signal in real time.

The general purpose processor 22 hosts an open architecture operating system and provides real time and non-real time control of open architecture peripherals and other networked peripherals. In one embodiment, the general purpose processor 22 is a Pentium™ processor running a self-contained, multitasking operating system (Window NT™). The general purpose processor 22 provides control signals, in response to operator inputs, that cause the other processing units (24, 26, 28, 30) to process selected input signals and generate a desired video output signal. The processor 22 programs the switching unit 12 to provide desired video output signal in real time.

The switcher 10 includes various processing units to provide complete support for both live broadcast and post production environments. A mix/effects (M/E) amplifier 24 is electrically coupled to the switching unit 12, the control processor 18 and the general purpose processor 22. The M/E amplifier 24 combines selected video input signals and produces desired video output signals. A storage unit 26 is coupled to the processors for storing video signals and video processing and system software. The storage unit 26 can include disk and CD ROM bays and memory. A network interface unit 28 can be coupled to the general purpose processor 22 for receiving input signals from remote devices and for providing output signals to remote devices over a local area network or a wide area network. More specifically, the network interface unit 28 can be used for image transmission/reception, transfer of control information to/from a network device (e.g., a CG or routing switcher) and to send/receive time and control parameters to network devices.

A digital video effects (DVE) unit 30 is coupled to the two processors via a PCI bus 32 and a Movie2 bus 34. In one embodiment, the DVE unit 30 is a GenieFusion™ 3D DVE manufactured by Pinnacle. The DVE unit 30 processes of video input signals and generates special effects video output signals. Such special effects can include page curls, flying video cubes, water ripples, spheres, highlights and shadows, and slats and waves. A multi-function video effects unit 36 can be coupled to the two processors via the buses 32, 34. The unit 36 provides JPEG clip store, still store and slow motion processing capabilities. In one embodiment, the unit 36 is a DigiMotion™ card manufactured by Matrox. At least one post-production digital video effects unit 38 can be coupled to the two processors for non-real time processing of video input signals for generating special effects video output signals. In one embodiment, the post-production digital video effects unit 38 is a DigiMix™ card manufactured by Matrox.

Equivalents

While the invention has been particularly shown and described with reference to specific preferred embodiments, it should be understood by those skilled in the art that various changes in form and detail may be made therein without departing from the spirit and scope of the invention as defined by the appended claims.

We claim:

1. A digital video production switcher for processing of a plurality of video signals in a production environment comprising:

a switching unit for receiving video input signals and for providing video output signals;

a control panel for receiving operator inputs;

a control processor electrically connected to the switching unit and the control panel, the control processor controlling production functions, the control processor being synchronized to a video frame rate and providing control signals, in response to operator inputs received from the control panel, that program the switching unit to provide desired video output signals in real time;

a general purpose processor electrically connected to the switching unit and the control processor, the general purpose processor running an open architecture operating system and being synchronized to a video frame rate, the general purpose processor providing control signals, in response to operator inputs received from the control processor, that program the switching unit to provide desired video output signals in real time;

the general purpose processor and the control processor being tightly coupled and independent of each other.

2. The switcher of claim 1 wherein the general purpose processor is running a self-contained, multitasking operating system.

3. The switcher of claim 1 wherein the control processor supports control panel operations independent of the general purpose processor.

4. The switcher of claim 1 further comprising at least one mix/effects amplifier electrically coupled to the switching unit and the control and general purpose processors, the at least one mix/effects amplifier, in response to control signals from the processors, combining selected video input signals to produce desired video output signals.

5. The switcher of claim 1 further comprising a storage unit electrically coupled to the control and general purpose processors for storing video signals.

6. The switcher of claim 1 further comprising a network interface unit electrically coupled to the general purpose processor for receiving input signals and for providing output signals over a local area network or a wide area network.

7. The switcher of claim 1 further comprising a digital video effects unit electrically coupled control and general purpose processors for processing of video input signals for generating special effects video output signals.

8. The switcher of claim 7 wherein the special effects video output signals include page curls, flying video cubes, water ripples, spheres, highlights and shadows, and slats and waves.

9. The switcher of claim 1 further comprising a multi-function video effects unit electrically coupled to the control and general purpose processors for providing JPEG clip store, still store and slow motion processing capabilities.

10. The switcher of claim 1 further comprising a post-production digital video effects unit electrically coupled to the control and general purpose processors for non-real time processing of video input signals for generating special effects video output signals.

11. The switcher of claim 1 wherein the control processor runs a closed architecture operating system.

12. A digital video production switcher comprising:

a switching unit for receiving video input signals and for providing video output signals;

a control processor electrically connected to the switching unit, the control processor controlling production functions, the control processor being synchronized to a video frame rate and providing control signals that program the switching unit to provide desired video output signals in real time;

a general purpose processor electrically connected to the switching unit and the control processor, the general purpose processor running an open architecture operating system and being synchronized to a video frame rate, the general purpose processor providing control signals that program the switching unit to provide desired video output signals in real time;

the general purpose processor and the control processor being tightly coupled and independent of each other.

13. The switcher of claim 12 wherein the general purpose processor is running a self-contained, multitasking operating system.

14. The switcher of claim 12 further comprising a control panel electrically connected to the control processor, the control panel receiving operator inputs and providing such inputs to the control processor.

15. The switcher of claim 12 wherein the control processor supports control panel operations independent of the general purpose processor.

16. The switcher of claim 12 further comprising at least one mix/effects amplifier electrically coupled to the switching unit and the electrically coupled to the control and general purpose processors, the at least one mix/effects amplifier, in response to control signals from the processors, combining selected video input signals to produce desired video output signals.

17. The switcher of claim 12 wherein the control processor runs a closed architecture operating system.

18. The switcher of claim 12 further comprising a dual port memory electrically connected to the control processor and the general purpose processor.

19. The switcher of claim 18 wherein the control processor and the general purpose processor share a section of the dual port memory to allow for high bandwidth communications.

* * * * *